(12) United States Patent
Liu

(10) Patent No.: US 11,198,451 B2
(45) Date of Patent: Dec. 14, 2021

(54) HIGH SPEED TRANSPORTATION WITH TRANSPORTER ENVELOPED BY LOW PRESSURE IN RUNNING TUBE

(71) Applicant: Marvin Liu, Jiangsu (CN)

(72) Inventor: Marvin Liu, Jiangsu (CN)

( * ) Notice: Subject to any disclaimer, the term of this patent is extended or adjusted under 35 U.S.C. 154(b) by 516 days.

(21) Appl. No.: 16/233,092

(22) Filed: Dec. 27, 2018

(65) Prior Publication Data
US 2019/0283782 A1 Sep. 19, 2019

Related U.S. Application Data

(63) Continuation of application No. PCT/CN2018/112146, filed on Oct. 26, 2018.

(30) Foreign Application Priority Data

| | | |
|---|---|---|
| Mar. 17, 2018 | (CN) | 201810221645.6 |
| Jul. 11, 2018 | (CN) | 201810756669.1 |
| Aug. 5, 2018 | (CN) | 201810881258.5 |
| Aug. 5, 2018 | (CN) | 201810881265.5 |
| Aug. 10, 2018 | (CN) | 201810910010.7 |
| Sep. 18, 2018 | (CN) | 201811083557.0 |
| Oct. 17, 2018 | (CN) | 201811206800.3 |

(51) Int. Cl.
| | |
|---|---|
| *B61B 13/10* | (2006.01) |
| *B61H 9/00* | (2006.01) |
| *B61C 15/04* | (2006.01) |
| *B61H 7/06* | (2006.01) |
| *B61H 11/06* | (2006.01) |

(52) U.S. Cl.
CPC ............ *B61B 13/10* (2013.01); *B61C 15/045* (2013.01); *B61H 7/06* (2013.01); *B61H 9/006* (2013.01); *B61H 11/06* (2013.01); *B60L 2200/26* (2013.01); *B60T 2210/20* (2013.01)

(58) Field of Classification Search
CPC ....... B61B 12/122; B61B 13/10; B61H 11/06; B61H 7/06; B61H 9/006; B60L 2200/26; B61C 15/045
See application file for complete search history.

(56) References Cited

U.S. PATENT DOCUMENTS

| | | | | |
|---|---|---|---|---|
| 2016/0121908 | A1* | 5/2016 | Ahmad | B65G 51/02 |
| | | | | 406/50 |
| 2016/0229427 | A1* | 8/2016 | Avetian | B61C 11/06 |
| 2018/0282006 | A1* | 10/2018 | Grip | G10H 1/46 |
| 2019/0283781 | A1* | 9/2019 | Liu | B61B 13/10 |

* cited by examiner

Primary Examiner — Scott A Browne

(57) ABSTRACT

A high-speed transportation with a transporter enveloped by low pressure in running tube includes a running tube, a running rail, a carrier structure, a control system, a braking system and a driving system. The running tube is an extended tube structure enveloped by a tube wall. A plurality of one-way airflow windows are provided on the tube wall, and the direction of airflow passing through the plurality of one-way airflow windows are controllable. The driving system includes a blocking-type running drive structure, a running blocking structure and a blocking-type running pressure-reducing structure which are provided in the running tube and run along the running tube. The carrier structure is a compartment structure. A connecting structure includes a flexible telescopic connecting structure and a rigid non-telescopic connecting structure.

17 Claims, 18 Drawing Sheets

HIGH SPEED TRANSPORTATION WITH TRANSPORTER ENVELOPED BY LOW PRESSURE IN RUNNING TUBE

CROSS-REFERENCE TO RELATED APPLICATIONS

This application is a continuation of International Patent Application No. PCT/CN2018/112146, filed on Oct. 26, 2018, which claims the benefit of priorities from Chinese Application No. 201810221645.6, filed on Mar. 17, 2018, CN 201810756669.1, filed on Jul. 11, 2018, CN201810881265.5, filed on Aug. 5, 2018, CN201810881258.5, filed on Aug. 5, 2018, CN 201810910010.7, filed on Aug. 10, 2018, CN 201811083557.0, filed on Sep. 18, 2018 and CN 201811206800.3, filed on Oct. 17, 2018. The entire contents of the aforementioned applications, including any intervening amendments thereto, are incorporated herein by reference.

TECHNICAL FIELD

The present disclosure relates to vehicles, and more particularly to a high-speed transportation with a transporter enveloped by low pressure in running tube.

BACKGROUND

Vehicles commonly used in our lives include automobiles, trains, airplanes, ships, electric vehicles and motorcycles. There are many types of automobiles and airplanes. According to the uses, the automobiles can be divided into passenger automobiles, trucks and special-purpose vehicles for construction engineering, agricultural production, sports competition and the like; and the airplanes can be divided into civilian passenger aircraft, military transport aircraft, military combat aircraft and the like. According to the adaptability to roads, the automobiles can be divided into ordinary automobiles and off-road automobiles. According to the types of engines, the automobiles can be divided into piston type internal combustion engine automobiles, electric automobiles and gas turbine automobiles; and the airplanes can be divided into propeller-driven aircraft and jet aircraft. The trains include regular trains, maglev trains and high-speed trains. Currently, the pipeline super high-speed rail being developed in the United States is a development direction of the high-speed rail transit. However, maintaining the vacuum and suspension state of the pipeline is a technical problem to be solved urgently. In addition, the underground tunnel rapid operation system being developed in the United States has disadvantage of high construction and operation costs. With the progress of the society and the development of the times, the requirement of people on the efficient use of time is higher. Saving time means improving efficiency. Therefore, developing a high-speed vehicle with the convenience of the trains and the automobiles and the running speed of the aircraft has very important practical value.

SUMMARY

The object of the present disclosure is to provide a high-speed transportation with a transporter enveloped by low pressure in running tube, including a running tube, a running rail, a carrier structure, a control system, a braking system and a driving system. The high-speed transportation with a transporter enveloped by low pressure in running tube has the following features:

1) The running tube is an extended tubing structure enveloped by a tube wall. A plurality of one-way airflow windows are installed on the tube wall, and a direction of airflow passing through the plurality of one-way airflow windows is controllable.

2) The driving system includes a blocking-type running drive structure in the running tube. The blocking-type running drive structure is an airtight plug-like blocking-type running drive structure, and is provided with a drive device. The blocking-type running drive structure is provided in a front of a running direction of the carrier structure and blocks a cross section of an inner cavity of the running tube, and runs back and forth by the drive device.

3) The driving system includes a running blocking structure in the running tube. The running blocking structure is an airtight plug-like running blocking structure. The running blocking structure is provided in a rear of the running direction of the carrier structure and blocks the cross section of the inner cavity of the running tube, and runs back and forth.

4) The blocking-type running drive structure, one or more of the carrier structure and the running blocking structure are sequentially arranged in the running tube from front to rear along the running direction of the carrier structure.

5) A drive connecting structure is provided between the blocking-type running drive structure and the carrier structure.

6) A cross-sectional area of the running tube, which is blocked by the blocking-type running drive structure and an auxiliary blocking structure of the blocking-type running drive structure, is larger than or equal to a cross-sectional area of the running tube, which is blocked by the carrier structure.

7) A cross-sectional area of the running tube, which is blocked by the running blocking structure and an auxiliary blocking structure of the running blocking structure, is larger than or equal to the cross-sectional area of the running tube, which is blocked by the carrier structure.

8) The driving system includes a pressure-reducing structure. The pressure-reducing structure is an exhaust device directly or indirectly connected to the carrier structure and is provided with an exhaust power device. An air inlet of the exhaust power device communicates with a cavity gap formed between an outer circumferential wall of the carrier structure and an inner sidewall of the running tube, and an air outlet of the exhaust power device communicates with air in the running tube located in a rear of the running blocking structure and/or in a front of the blocking-type running drive structure.

The airtight plug-like blocking-type running drive structure may discharge the air in the running tube through the plurality of one-way airflow windows to locally form a semi-vacuum state in the running tube, and drive the carrier structure to run forwardly. An air pressure difference is formed in the running tube formed with the semi-vacuum state and the rear of the carrier structure to push the carrier structure to run forwardly.

A ratio of the cross-sectional area of the running tube, which is blocked by the blocking-type running drive structure, to the cross-sectional area of the running tube, which is blocked by the carrier structure, is 1:1-1:0.7, preferably 1:1-1:0.8 and more preferably 1:1-1:0.9. A ratio of the cross-sectional area of the running tube blocked by the running blocking structure to the cross-sectional area of the running tube blocked by the carrier structure is 1:1-1:0.7, preferably 1:1-1:0.8 and more preferably 1:1-1:0.9.

The plurality of one-way airflow windows include a plurality of passive opening type one-way airflow windows and a plurality of active opening type one-way airflow windows with mechanical kinetic energy.

The plurality of passive opening type one-way airflow windows are opened under an air pressure difference formed inside and outside of the running tube, and include a plurality of passive type outward one-way airflow windows being opened when an air pressure inside the running tube is larger than an air pressure outside of the running tube. The plurality of passive opening type one-way airflow windows are distributed at multiple parts of a wall of the running tube.

The plurality of active opening type one-way airflow windows are driven by the mechanical kinetic energy, and include a plurality of active type outward one-way airflow windows and a plurality of active type inward one-way airflow windows. The plurality of active opening type one-way airflow windows are distributed at multiple parts of the wall of the running tube.

The pressure-reducing structure includes a blocking-type running pressure-reducing structure. The blocking-type running pressure-reducing structure is provided with an exhaust power device in the running blocking structure. An air inlet of the exhaust power device is provided in a front of a running direction of the running blocking structure and communicates with air in a gap between the carrier structure and the inner sidewall of the running tube. An air outlet of the exhaust power device is provided in a rear of the running direction of the running blocking structure and communicates with air in the running tube located in the rear of the running blocking structure. The blocking-type running pressure-reducing structure includes an independent blocking-type running pressure-reducing structure independent of the carrier structure and provided in the rear of the carrier structure, and a combined blocking-type running pressure-reducing structure which is integrated with the carrier structure.

The exhaust power device includes a turbo fan, a ducted fan, an axial-flow fan, a ramjet, a pulse jet, a bladeless fan, an electric fan, a fan engine, a ducted fan engine, a turbofan engine, a turbojet engine, and a ramjet engine, a pulse jet engine and a turbofan jet engine.

The drive connecting structure includes at least one structure selected from:

1) a flexible telescopic connecting structure, including at least one of an elastic telescopic connecting structure, a filling and extruding type telescopic connecting structure, a rigid tube telescopic connecting structure, a flexible tube telescopic connecting structure and an indirect connecting structure; and 2) a rigid non-telescopic connecting structure, including at least one of an integrated curing type connecting structure, a coupler type non-telescopic connecting structure and a laterally-movable type connecting structure.

Scalability of the elastic telescopic connecting structure is related to a tensile force, such as the tensile force applied to the elastic telescopic connecting structure using springs. The filling and extruding type telescopic connecting structure is formed by flexible porous materials including sponges or porous rubber, and scalability of the filling and extruding type telescopic connecting structure is related to a tensile force applied to the flexible porous materials. The rigid tube telescopic connecting structure is formed by rigid tube telescopic materials, such as superimposed sliding steel rings. The flexible tube telescopic connecting structure is formed by flexible materials, such as rubber tubes. The indirect connecting structure is a structure in free state only with air between two connected components.

The integrated curing type connecting structure is an integrated structure of two connected components which cannot be separated from each other, such as the combined running blocking structure. The laterally-movable type connecting structure is a structure moving up and down, left and right, but incapable of moving back and forth. The coupler type non-telescopic connecting structure includes a coupler connecting structure between compartments of trains.

An elastic blocking structure is provided at a driving-in end of the carrier structure of the running tube. The elastic blocking structure is provided at an opening in a middle portion of the inner sidewall of the running tube and extrudes outwardly. The elastic blocking structure is provided at a periphery of the inner sidewall of the running tube. An opening is provided in a middle portion of the elastic blocking structure for the blocking-type running drive structure, one or more of the carrier structure and the running blocking structure which form an integrated structure to pass through. When the integrated structure passes through the opening, the elastic blocking structure maintains a close contact with an outer wall of the integrated structure, thereby avoiding the air in the running tube entering into a carrying chamber of the carrier structure during running through an exposed gap (a carrying chamber) between the carrier structure and the running tube.

The running blocking structure runs back and forth through the drive device, and includes an independent running blocking structure independent of the carrier structure and provided in a rear of the carrier structure and a combined running blocking structure which is integrated with the carrier structure.

A manner for connecting the running blocking structure to the carrier structure includes at least one of:

1) a flexible telescopic connecting manner, including at least one of an elastic telescopic connecting manner, a flexible filling and extruding type connecting manner, a rigid tube telescopic connecting manner, a flexible tube connecting manner and an indirect connecting manner; and 2) a rigid non-telescopic connecting manner, including at least one of an integrated curing type connecting manner, a coupler type non-telescopic connecting manner and a laterally-movable type connecting manner.

The blocking-type running drive structure includes at least one of the following features:

1) a rear portion of the blocking-type running drive structure is of a planar structure or a curved structure;

2) a front portion of the blocking-type running drive structure is of a structure extruding to a middle portion which protrudes forwardly;

3) the blocking-type running drive structure includes an opening-closing type structure opening from inside to outside;

4) the blocking-type running drive structure includes an opening-closing type structure opening from a center to a periphery;

5) the blocking-type running drive structure is provided with a plurality of drive devices; and 6) a collision buffer structure is provided in the rear of the running direction of the blocking-type running drive structure to buffer a collision with the carrier structure when the carrier structure runs forwardly.

The driving system includes an auxiliary blocking structure including at least one structure selected from:

1) a rolling contact type auxiliary blocking structure provided outside the blocking-type running drive structure and/or the running blocking structure, wherein a blocking structure in a rolling contact manner is provided between the outer side face of the rolling contact auxiliary blocking structure and the inner sidewall of the running tube;

2) a proximity-contact type auxiliary blocking structure provided outside the blocking-type running drive structure and/or the running blocking structure, wherein a blocking structure in a proximity-contact manner is provided between an outer side face of the proximity-contact type auxiliary blocking structure and the inner sidewall of the tube; and 3) a sliding contact type auxiliary blocking structure provided outside the blocking-type running drive structure and/or the running blocking structure, wherein a blocking structure in a sliding contact manner is provided between the outer side face of the sliding contact type auxiliary blocking structure and the inner sidewall of the running tube.

The running rail includes at least one of the following features:

1) the running rail is provided on at least one of a lower side face, an upper side face, a left side and a right side in the running tube; and 2) a structure provided between the running rail and the drive device includes at least one of a wheel-rail drive structure, a linear motor drive structure, a magnetic levitation drive structure and a reaction force drive structure.

The carrier structure includes at least one structure of a compartment structure and a loaded structure. The carrier structure includes at least one of the following features:

1) the carrier structure is provided with an independent drive device;

2) the carrier structure is provided in the rear of the blocking-type running drive structure;

3) the running blocking structure is provided in the rear of the carrier structure;

4) a collision buffer structure is provided in the front of the carrier structure to buffer a collision with a rear portion of the blocking-type running drive structure when the carrier structure runs forwardly;

5) an outer shape of the carrier structure is of a tube blocking structure;

6) the carrier structure is provided with the exhaust power device with a running direction from front to back;

7) the carrier structure is provided with a wing-like structure extending longitudinally;

8) a magnetic levitation structure is provided in a lower portion of the carrier structure corresponding to a lower sidewall of the running tube;

9) a plurality of carrier structures are connected in series to run;

10) a cross-sectional area of the carrier structure is less than or equal to a cross-sectional area of the blocking-type running drive structure; and 11) the cross-sectional area of the carrier structure is less than or equal to a cross-sectional area of the running blocking structure.

A manner for driving the drive device includes at least one of a wheel-rail driving manner, a linear motor driving manner, an exhaust driving manner and a reaction force driving manner.

A plurality of position holding structures when running in the running tube are provided on the inner sidewall of the running tube and the outer side face corresponding to the carrier structure and/or the blocking-type running drive structure and/or the running blocking structure. The plurality of position holding structures provided on the inner sidewall of the running tube are matched with the plurality of position holding structures provided on the outer side face corresponding to the carrier structure and/or the blocking-type running drive structure and/or the running blocking structure.

The plurality of position holding structures have at least one of the following features:

1) a plurality of magnetic repulsion structure having at least one of permanent magnetism and electromagnetism are provided on a left inner sidewall and a right inner sidewall of the running tube and the outer side face corresponding to the carrier structure and/or the blocking-type running drive structure and/or the running blocking structure, respectively; and a width of a gap between the inner sidewall of the running tube and the outer side face corresponding to the blocking-type running drive structure and/or the running blocking structure is 1-50 mm, preferably 1-30 mm and more preferably 1-10 mm;

2) a sliding rail is mounted on the left inner sidewall and the right inner sidewall of the running tube, respectively; and a pulley is mounted on the outer side face corresponding to the carrier structure and/or the blocking-type running drive structure and/or the running blocking structure, wherein the pulley slides along the sliding rail; and 3) a pulley is mounted on the left inner sidewall and the right inner sidewall of the running tube, respectively; and a rigid sliding rail is provided on the outer side face corresponding to the carrier structure and/or the blocking-type running drive structure and/or the running blocking structure, wherein the pulley slides along the rigid sliding rail.

A width of a gap between the outer circumferential wall of the blocking-type running drive structure and/or the running blocking structure and the inner sidewall of the running tube is 1-50 mm, preferably 1-30 mm and more preferably 1-10 mm.

The braking system includes an active closing of a plurality of one-way airflow windows on a wall of the running tube provided in a front of a running portion of the blocking-type running drive structure.

The high-speed transportation with a transporter enveloped by low pressure in running tube further includes a plurality of sensors provided on the carrier structure, the running rail, the running tube, the braking system and the driving system, and the plurality of sensors are electrically connected to the control system.

An application of the high-speed transportation with a transporter enveloped by low pressure in running tube in developing a high-speed vehicle is disclosed.

The present disclosure has the following advantages:

1. The plurality of passive type outward one-way airflow windows provided on the wall of the running tube are opened under an air pressure difference formed inside and outside of the running tube. The blocking-type running drive structure is provided in the running tube. When the blocking-type running drive structure runs in the running tube, the air pressure in the front of the blocking-type running drive structure is increased, so that the air pressure in the running tube is larger than the air pressure outside of the running tube, leading to the opening of the plurality of passive type outward one-way airflow windows. In this way, the air in the running tube rapidly flows out of the running tube through the plurality of passive type outward one-way airflow windows, thus, the air pressure in the rear of the blocking-type running drive structure is lower. At this time, the air pressure in the running tube in the rear of the blocking-type running drive structure is lower than the air pressure outside the running tube, forming a negative air pressure difference to rapidly close the plurality of passive type outward one-way airflow windows. The carrier structure located in the rear of plurality of passive type outward one-way airflow windows runs at a low pressure, reducing the forward and lateral air resistance for the carrier structure running in the running tube, and improving the running efficiency.

2. The running blocking structure provided in the running tube and located in the rear of the carrier structure avoids the high-pressure air in the rear of the running blocking structure entering into the low-pressure area of the carrier structure in a blocking manner, so that the low-pressure state of the carrier structure is maintained. Thus, the lateral air resistance for the carrier structure running in the running tube is reduced and the running efficiency is improved.

3. The plurality of active opening type one-way airflow windows with mechanical kinetic energy are provided on the wall of the running tube, and the plurality of active type inward one-way airflow windows located in the rear of the running direction of the running blocking structure in the rear of the carrier structure open actively, so that the air outside the running tube rapidly enters into the running tube. In this way, the reverse thrust caused by the negative-pressure state formed in the rear of the carrier structure during the running of the blocking-type running drive structure is reduced, thereby improving the running efficiency.

4. The blocking-type running pressure-reducing structure is provided in the running tube to assist in maintaining the low-pressure state of the carrier structure. During the running of the carrier structure, a small amount of air outside the running tube will continuously flow into the running tube to affect the low-pressure state in the running tube. The blocking-type running pressure-reducing structure located in the rear of the carrier structure continuously discharges the air in the running tube out through the exhaust power device to maintain the low-pressure state of the carrier structure, reduce the lateral air resistance for the carrier structure running in the running tube, and improve the running efficiency.

5. The flexible telescopic connecting structure are provided between the blocking-type running drive structure and the carrier structure, which can ensure the formation of the negative pressure in the rear the blocking-type running drive structure, and avoid the carrier structure colliding with the blocking-type running drive structure when the blocking-type running drive structure is decelerated and the carries structure runs forwardly, ensuring the running safety.

6. The carrier structure is provided with the wing-like structure extending longitudinally. As the running speed is increased, the upward force is generated by aerodynamics, so that the carrier structure can be suspended to run in a take-off state, improving the running efficiency.

7. Because the plurality of one-way airflow windows provided on the wall of the running tube in the front of the blocking-type running drive structure are closed, the air in the front of the blocking-type running drive structure cannot be eliminated. Thus, an air resistance layer is formed in the running tube to form a brake system that the running tube is integrated with the transporter, which improves the braking efficiency.

8. The cross-sectional area of the running tube, which is blocked by the blocking-type running drive structure and the running blocking structure, is larger than the cross-sectional area of the running tube which is blocked by the carrier structure, that is, the cross-sectional area of the carrier structure is smaller than the cross-sectional areas of the blocking-type running drive structure and the running blocking structure, so that an amount of air flowing into the gap between the blocking-type running drive structure and the running blocking structure and the running tube is significantly smaller than the volume of the gap between the carrier structure and the running tube to form a negative pressure.

9. Running in the running tube, the carrier structure will not be affected by the external environment such as wind, rain, snow, lightning, etc., which improves the running safety, and significantly reduces the additional design and construction costs caused by overcoming the above environmental impacts. At the same time, the running tube is simple in structure and convenient in construction, so it can be placed on the ground, under the ground, on the bridge and in the tunnel, significantly reducing the road construction cost.

DETAILED DESCRIPTION OF EMBODIMENTS

Figure 1:
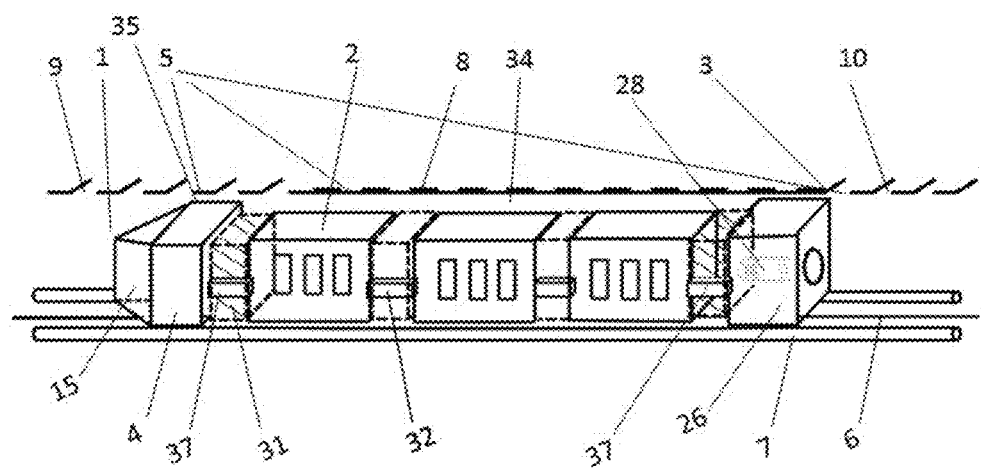
FIG. 1 is a schematic diagram of a high-speed transportation with a transporter enveloped by low pressure in running tube of the present disclosure.

The present disclosure will be described in detail below with reference to the accompanying drawings and embodiments which are only illustrative of the present disclosure.

As shown in FIGS. 1-12, the present disclosure includes a running tube 1. A plurality of one-way airflow windows 3 are provided on the upper wall 5 and the sidewall 16 of the running tube 1, including a plurality of passive opening type one-way airflow windows 9, a plurality of closing type one-way airflow windows 8 and a plurality of active opening type one-way airflow windows 10 which are sequentially provided in the front, the middle and the rear of a carrier structure 2. The plurality of one-way airflow windows 3 are distributed on both sides and top of the carrier structure 2. A running rail 7 is fastened to an inner bottom 6 of the running tube 1. A blocking-type running drive structure 4, the carrier structure 2 being a compartment structure and a running blocking structure 26 are slidably provided on the running rail 7. The blocking-type running drive structure 4 and the running blocking structure 26 are of a blocking-type running structure to nearly block the running tube 1. The blocking-type running drive structure 4 independent of the carrier structure 2 is located in the front of the carrier structure 2, and is formed by a baffle-like structure having the same inner peripheral shape of the running tube 1, a drive device 11, a diversion head 15 and a diversion body 18. The diversion head 15 and the diversion body 18 form an air diversion device located in the front of the blocking-type running drive structure 4. The blocking-type running drive structure 4 is connected to the carrier structure 2 by a drive connecting structure 31 internally provided with a rigid non-telescopic connecting structure 37. The running blocking structure 26 is located in the rear of the carrier structure 2, and is directly connected to the carrier structure 2. The running blocking structure 26 is formed by a baffle-like structure having the same inner peripheral shape of the running tube 1 and a drive device 25. The running blocking structure 26 is connected to the carrier structure 2 through the rigid non-telescopic connecting structure 37. The adjacent carrier structures 2 are connected through a rigid non-telescopic structure 32. The blocking-type running drive structure 4 in the front of the carrier structure 2 is horizontally provided with a dividing device 21 extending outwardly. The dividing device 21 is configured to divide the airflow in the front of the blocking-type running drive structure 4 into an upstream airflow flowing through the upper portion of the carrier structure 2 and a downward airflow flowing through the lower portion of the carrier structure 2. An air inlet 19 is provided in the front of the carrier structure 2, and the carrier structure 2 is provided with a ventilation duct 14 communicating with one end of the dividing device 21 and an air-suction drive device 13. The air-suction drive device 13 is electrically connected to the control system (not shown in the drawings) for controlling the running state of the carrier structure 2.

Figure 7:
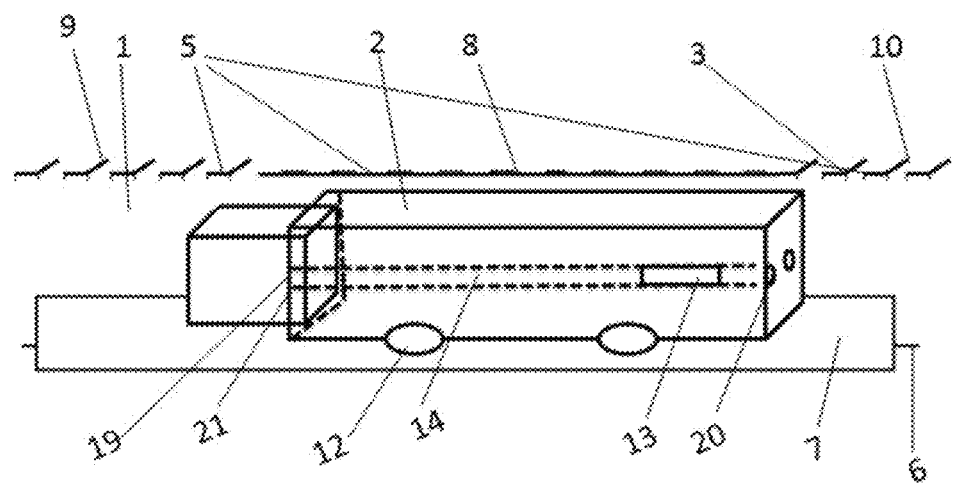
FIG. 7 is a schematic diagram of the carrier structure.
Figure 8:
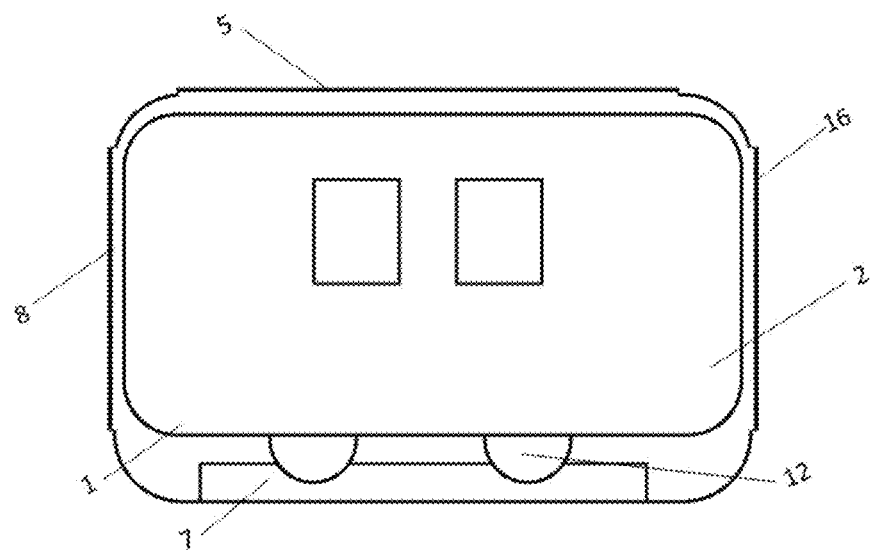
FIG. 8 is a schematic diagram of the carrier structure in the running tube.
Figure 13:
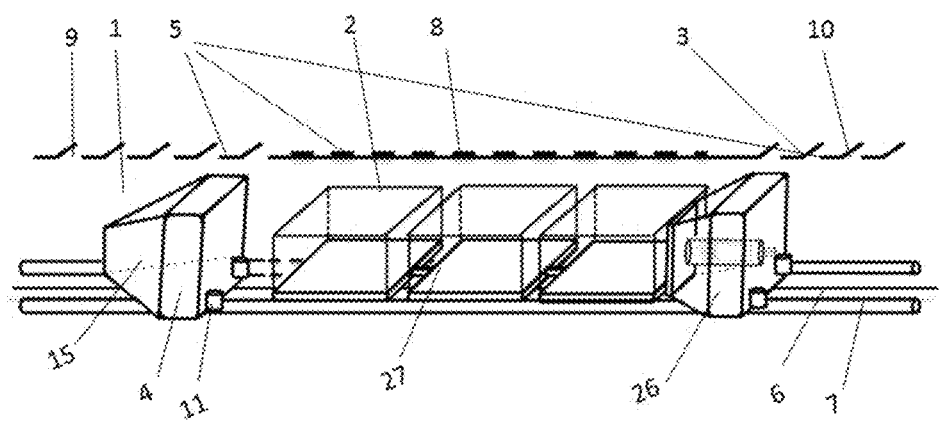
FIG. 13 is a schematic diagram of a loaded structure as the carrier structure of the present disclosure.

In the above embodiments, as shown in FIGS. 1, 7 and 13, the running blocking structure 26 in the rear of the carrier structure 2 can avoid a large amount of the atmospheric air in the running tube located in the rear of the carrier structure 2 entering into the low-pressure area in a blocking manner, so that the low-pressure running of the carrier structure 2 is not affected. The air-suction drive device 13 is disposed inside or outside the carrier structure 2. When the air-suction drive device 13 is disposed in the carrier structure 2, the air-suction drive device 13 includes the ventilation duct 14 which is hollow and is disposed horizontally on the inner lower side of the carrier structure 2. The other end of the ventilation duct 14 is connected to the input end of the air-suction drive device 13 through a tube, and the output end of the air-suction drive device 13 is connected to the air outlet 20 in the rear of the carrier structure 2 through a tube.

Thus, after the air-suction drive device 13 is started, the air pressure in the front of the carrier structure 2 is inhaled into the ventilation duct 14 due to the high-speed suction power of the air-suction drive device 13, so that the air in the front of the carrier structure 2 is lowered, which significantly reduces the forward air resistance, thereby pushing the carrier structure 2 to run forwardly.

Figure 2:
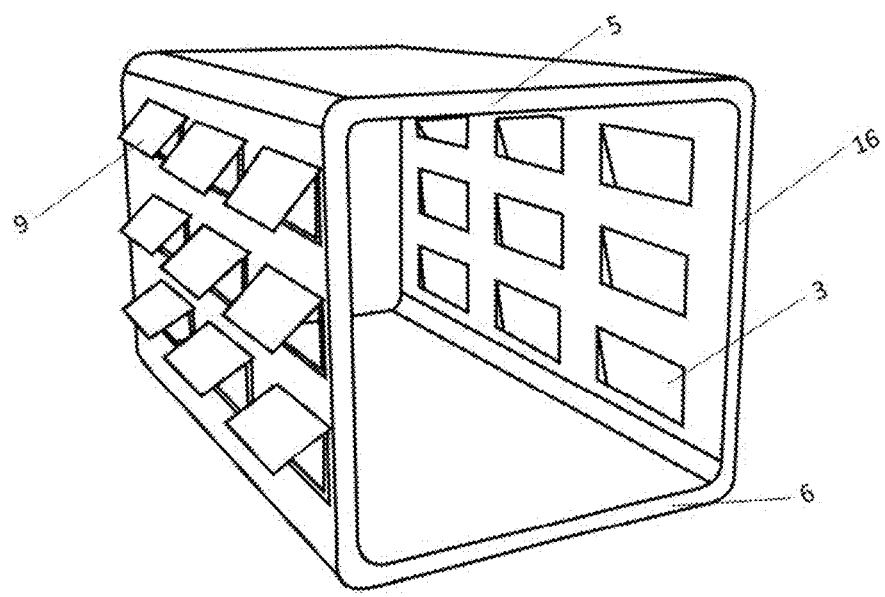
FIG. 2 is a schematic diagram of an opening structure of a plurality of one-way airflow windows provided on left and right inner sidewalls of a running tube.
Figure 3:
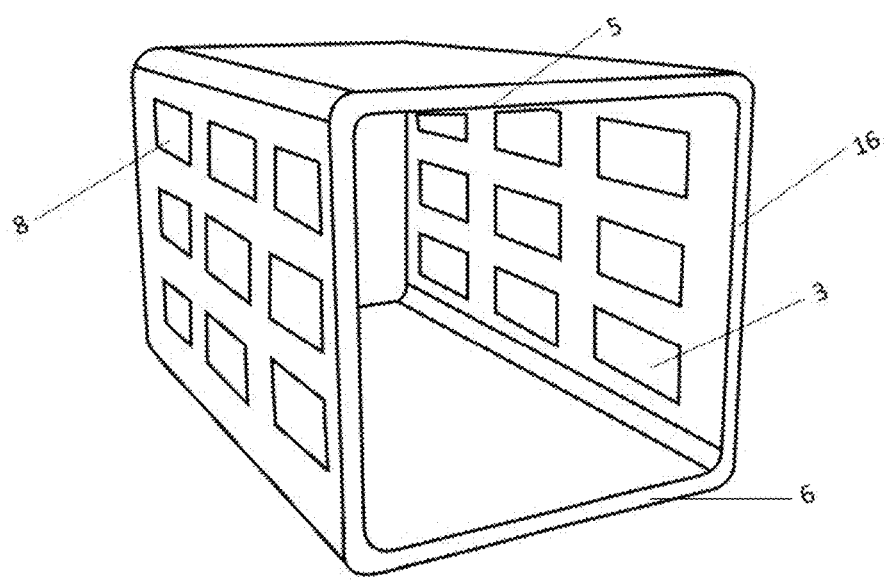
FIG. 3 is a schematic diagram of a closing structure of the plurality of one-way airflow windows provided on the left and right inner sidewalls of the running tube.

In the above embodiments, as shown in FIGS. 2 and 3, the plurality of one-way airflow windows 3 are provided on the left and right inner sidewalls 16 of the running tube 1. When the air pressure in the running tube 1 is larger than the air pressure outside the running tube 1, the plurality of one-way airflow windows 3 are opened, which are the plurality of passive opening type one-way airflow windows 9. When the air pressure in the running tube 1 is equal to or less than the air pressure outside the running tube 1, the plurality of one-way airflow windows 3 are automatically closed, which are the plurality of closing type one-way airflow windows 8. The air pressure in the rear of the running direction of the blocking-type running drive structure 4 is lower than the air pressure outside of the running tube 1 through the airflow adjustment to locally form a semi-vacuum state in the running tube 1, which significantly reduces the forward air resistance of the carrier structure 2, and increases the forward thrust in the rear of the carrier structure 2.

Figure 5:
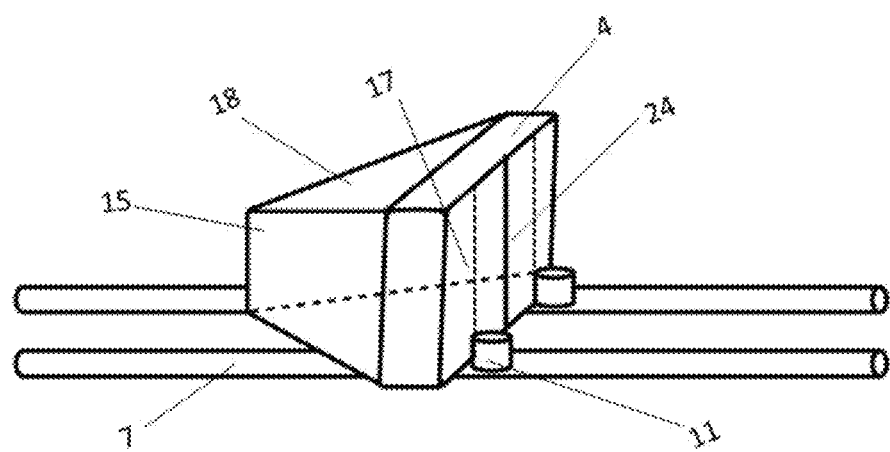
FIG. 5 is a schematic diagram of a blocking-type running drive structure.
Figure 6:
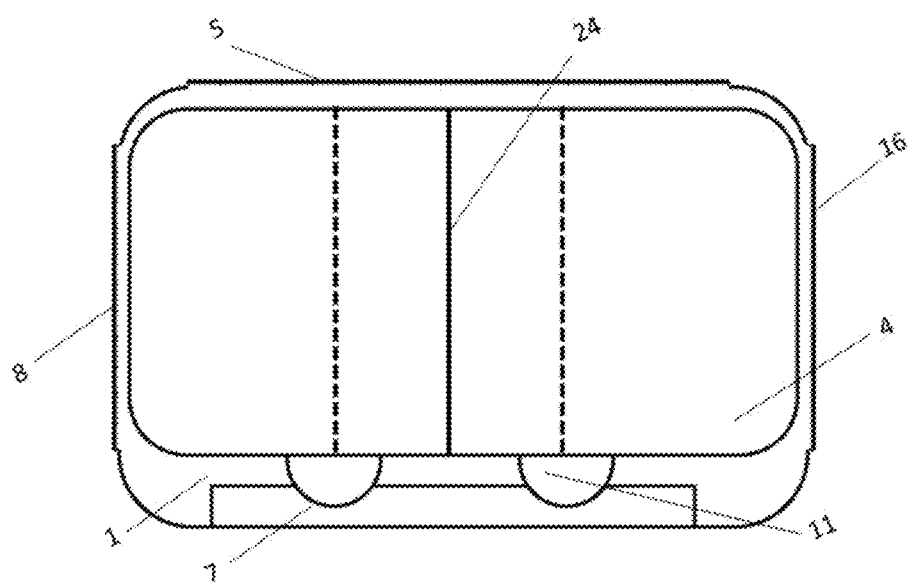
FIG. 6 is a schematic diagram of the blocking-type running drive structure in the running tube.

In the above embodiments, as shown in FIGS. 5 and 6, the blocking-type running drive structure 4 incompletely blocks the running tube 1 and has a smaller space in the outer circumference adjacent to the running tube 1. A width of a gap between the outer circumferential wall of the blocking-type running drive structure 4 and the inner sidewall of the running tube 1 is 1-50 mm, and preferably 1-30 mm. The rear portion of the blocking-type running drive structure 4 is of a planar structure or a curved structure. The front portion of the blocking-type running drive structure 4 is of a structure extruding to a middle portion which protrudes forwardly. The front portion of the blocking-type running drive structure 4 is formed by the diversion head 15 and the diversion body 18 which form the air diversion device, and are provided with a plurality of drive devices 11. The rear portion of the blocking-type running drive structure 4 includes an opening-closing type structure opening from inside to outside and an opening-closing type structure opening from the center to the periphery. The opening-closing type structures can control the opening and closing of the blocking-type running drive structure 4, and can be used as a collision buffer structure 24 to buffer the collision with the carrier structure 2.

Figure 9:
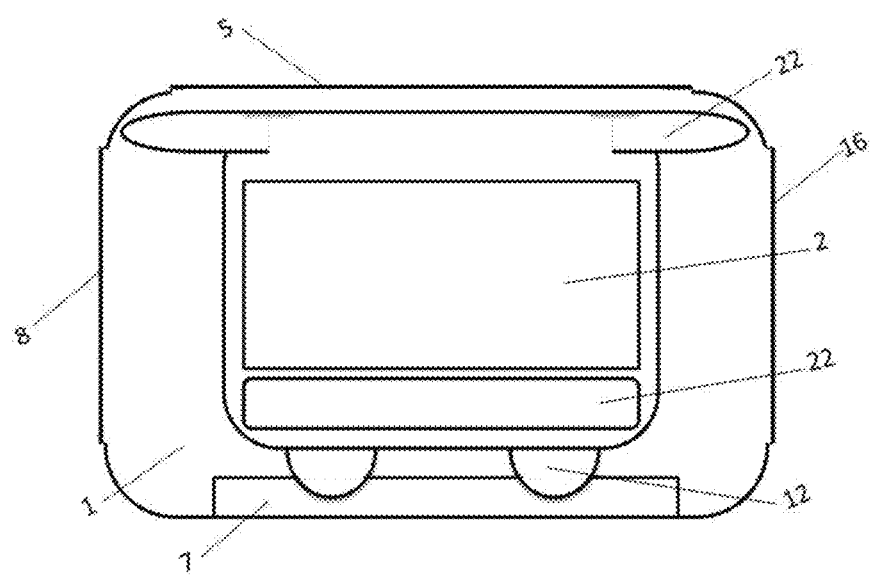
FIG. 9 is a schematic diagram of the carrier structure including a wing-like structure in the running tube.

In the above embodiments, as shown in FIG. 9, a wing-like structure 22 is provided on both sides of the upper portion of the carrier structure 2, respectively. When the carrier structure 2 runs, most of the airflow in front of the blocking-type running drive structure 4 being the upward airflow enters into the upper airflow space above the carrier structure 2, and is discharged through the rear portion, so that a high-speed airflow is formed above the carrier structure 2 and the wing-like structure 22. A large difference of the airflow velocity is formed between below and above the wing-like structure 22 due to low airflow entering below the wing-like structure 22, which significantly increases the suspension capacity of the carrier structure 2.

Figure 10:
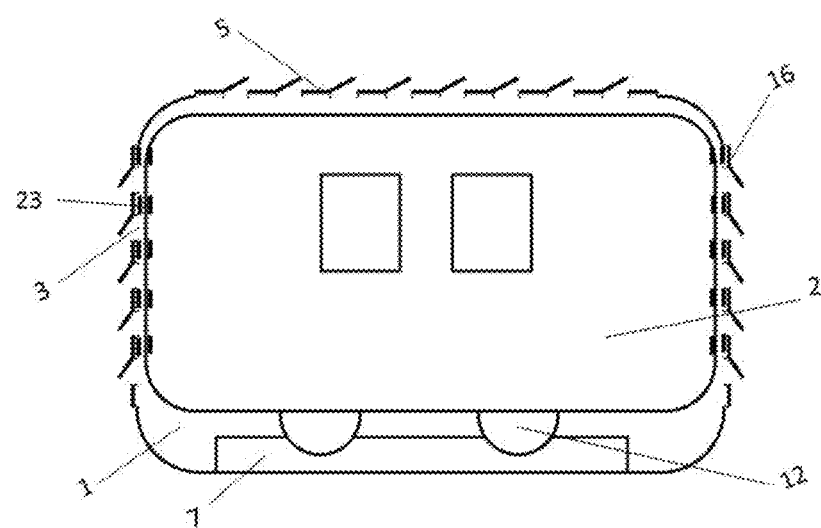
FIG. 10 is a schematic diagram of a plurality of position holding structures between the carrier structure and the running tube.
Figure 11:
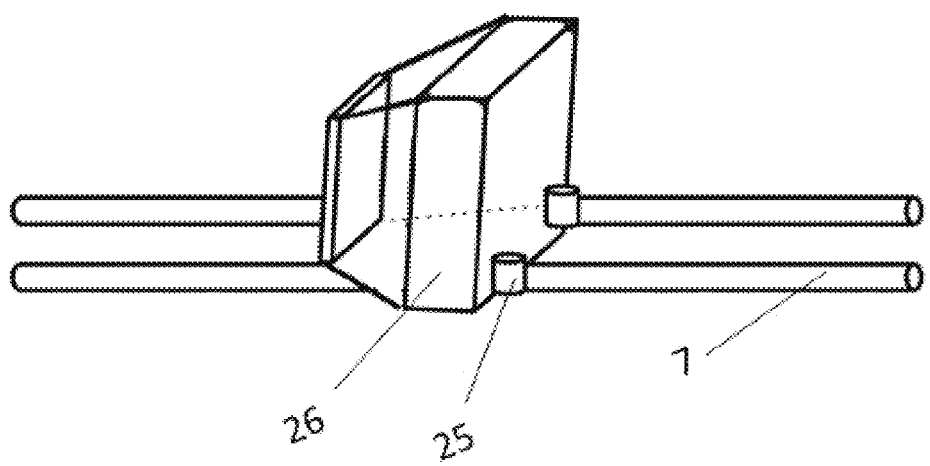
FIG. 11 is a schematic diagram of a running blocking structure.
Figure 12:
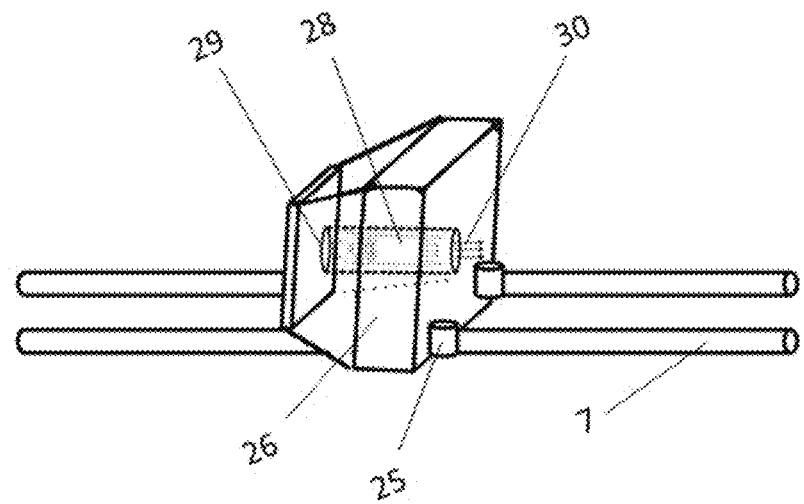
FIG. 12 is a schematic diagram of a blocking-type running pressure-reducing structure.

In the above embodiments, as shown in FIG. 10, a plurality of position holding structures are provided on the left and right inner sidewalls of the running tube 1 and on the outer side face corresponding to the carrier structure 2 and/or the blocking-type running drive structure 4. Each of the plurality of position holding structures is a magnetic device 23. The magnetic device 23 disposed on the outer side face corresponding to the carrier structure 2 and/or the blocking-type running drive structure 4 is matched with the magnetic device 23 disposed on the left and right inner sidewalls of the running tube 1. The gap between the magnetic device 23 disposed on the left and right inner sidewalls of the running tube 1 and the magnetic device 23 disposed on the outer side face corresponding to the carrier structure 2 and/or the blocking-type running drive structure 4 is 1-50 mm, and preferably 3-30 mm. The gap maintains a fixed running space between the carrier structure 2 and/or the blocking-type running drive structure 4 and the running tube 1 in the running process to avoid frictional collision.

In the above embodiments, as shown in FIGS. 1 and 12-14, a blocking-type running pressure-reducing structure is provided in the rear of the carrier structure 2. The air in the running tube is flowed into the air inlet 29 and is discharged from the air outlet 30 through the exhaust power device 28, assisting in maintaining the low-pressure state of the carrier structure.

In the above embodiments, as shown in FIG. 13, the carrier structure 2 is a loaded structure 27, which can drive in and carry the small vehicles and other articles.

Figure 14:
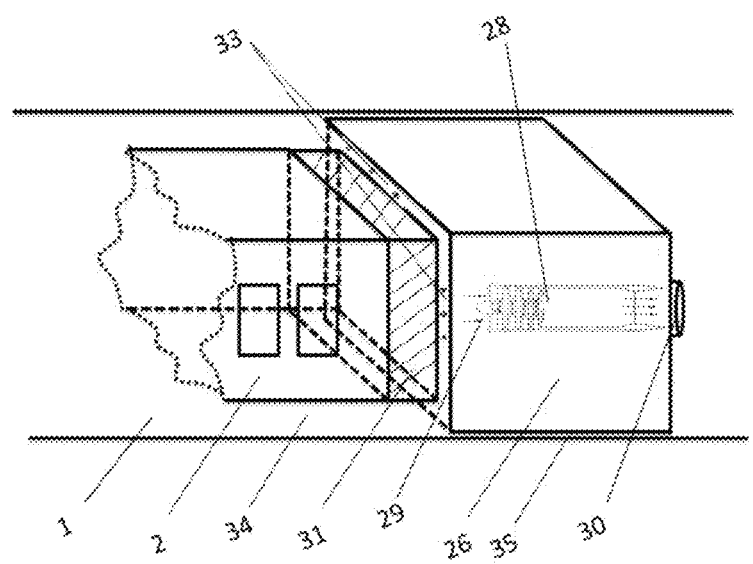
FIG. 14 is a schematic diagram of a position relation of the running blocking structure and the carrier structure.

In the above embodiments, as shown in FIG. 14, the cross section of the running blocking structure 26 is larger than the cross section of the carrier structure 2. A gap 35 between the running blocking structure 26 and the inner sidewall of the running tube 1 is smaller than a gap 34 between the carrier structure 2 and the inner sidewall of the running tube 1. An extension structure 33 is formed at a joint of the running blocking structure 26 and the carrier structure 2 connected through a telescopic connecting structure 31 to partially block the gap 34 between the carrier structure 2 and the inner sidewall of the running tube 1. The extension structure 33 is provided with the air inlet of the exhaust power device 28 in the front of the running blocking structure 26 to suck the residual air in the gap 34 between the carrier structure 2 and the running tube 1. The ratio of the cross-sectional area of the running blocking structure 26 to the cross-sectional area of the carrier structure 2 is 1:1-1:0.7, preferably 1:1-1:0.8 and more preferably 1:1-1:0.9. For example, when the outer diameter of the carrier structure 2 is 2 m (height)×3 m (width), and the ratio is 1:0.7, the outer diameter of the running blocking structure 26 may be 3.9 m×2.2 m. The outer diameter of the carrier structure 2 is 2 m (height)×3 m (width), and the ratio is 1:0.8, the outer diameter of the running blocking structure 26 may be 3.4 m×2.2 m. When the ratio is 1:0.9, the outer diameter of the running blocking structure 26 may be 3.2 m×2.1 m.

Figure 15:
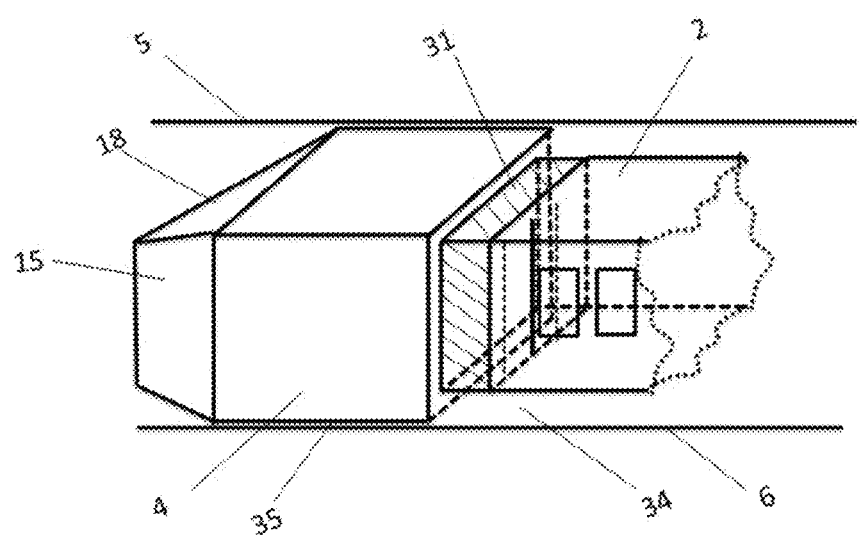
FIG. 15 is a schematic diagram of a position relation of the blocking-type running drive structure and the carrier structure.

In the above embodiments, as shown in FIG. 15, the cross section of the blocking-type running drive structure 4 is larger than the cross section of the carrier structure 2. The gap 35 between the tube inner cavity blocking type running drive structure 4 and the running tube 1 is smaller than a gap 34 between the carrier structure 2 and the running tube 1. The ratio of the cross-sectional area of the blocking-type running drive structure 4 to the cross-sectional area of the carrier structure 2 is 1:1-1:0.7, preferably 1:1-1:0.8 and more preferably 1:1-1:0.9. For example, when the outer diameter of the carrier structure 2 is 2 m (height)×3 m (width), and the ratio is 1:0.7, the outer diameter of the blocking-type running drive structure 4 may be 3.9 m×2.2 m. The outer diameter of the carrier structure 2 is 2 m (height)×3 m (width), and the ratio is 1:0.8, the outer diameter of the blocking-type running drive structure 4 may be 3.4 m×2.2 m. When the ratio is 1:0.9, the outer diameter of the blocking-type running drive structure 4 may be 3.2 m×2.1 m.

Figure 16:
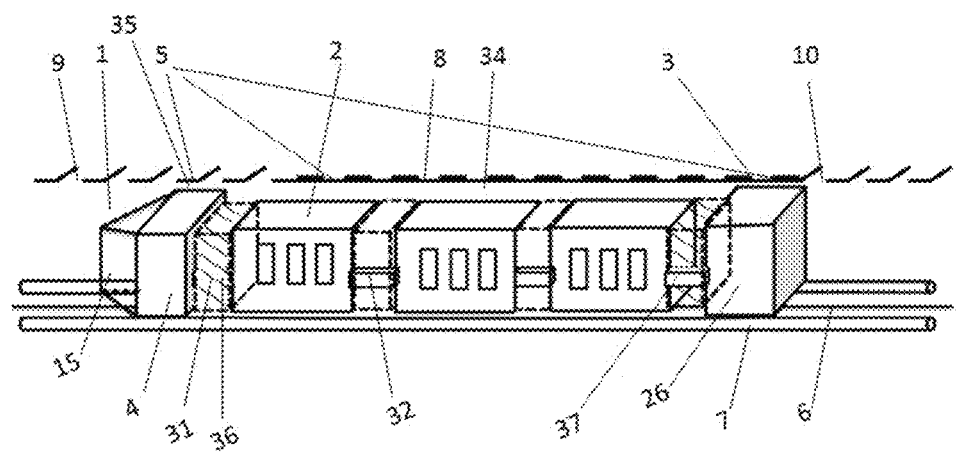
FIG. 16 is a schematic diagram of the vehicle with a flexible telescopic connecting structure as a drive connecting structure.

In the above embodiments, as shown in FIG. 16, the blocking-type running drive structure 4 and the carrier structure 2 are connected through a flexible telescopic connecting structure 36, and the running blocking structure 26 and the carrier structure 2 are connected through the rigid non-telescopic connecting structure 37.

Figure 17:
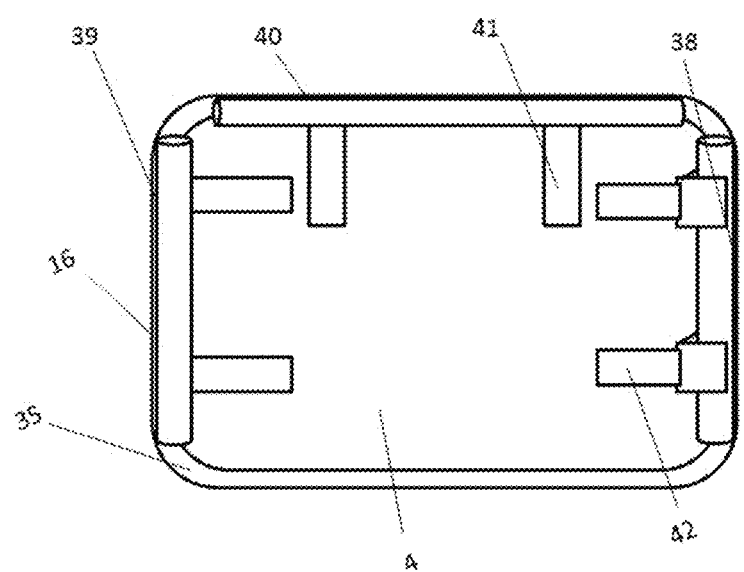
FIG. 17 is a schematic diagram of an auxiliary blocking structure of the present disclosure.

In the above embodiments, as shown in FIG. 17, the auxiliary blocking structure includes a rolling contact type auxiliary blocking structure 38, a proximity-contact type auxiliary blocking structure 39 and a sliding contact type auxiliary blocking structure 40. The rolling contact type auxiliary blocking structure 38 is provided outside the blocking-type running drive structure 4 and is fixed to the blocking-type running drive structure 4 through a fixing arm 42. The outer side face of the rolling contact auxiliary blocking structure 38 and the inner sidewall of the running tube 1 are contacted in a rolling manner. The proximity-contact type auxiliary blocking structure 39 is provided outside the blocking-type running drive structure 4 and is fixed to the blocking-type running drive structure 4 through a fixing arm 41. The outer side face of the proximity-contact type auxiliary blocking structure 39 and the inner sidewall of the running tube 1 are contacted in a proximity-contact manner. The sliding contact type auxiliary blocking structure 40 is provided outside the blocking-type running drive structure 4 and is fixed to the blocking-type running drive structure 4 through a fixing arm 41. The outer side face of the sliding contact type auxiliary blocking structure 40 and the inner sidewall of the running tube 1 are contacted in a sliding manner.

Figure 18:
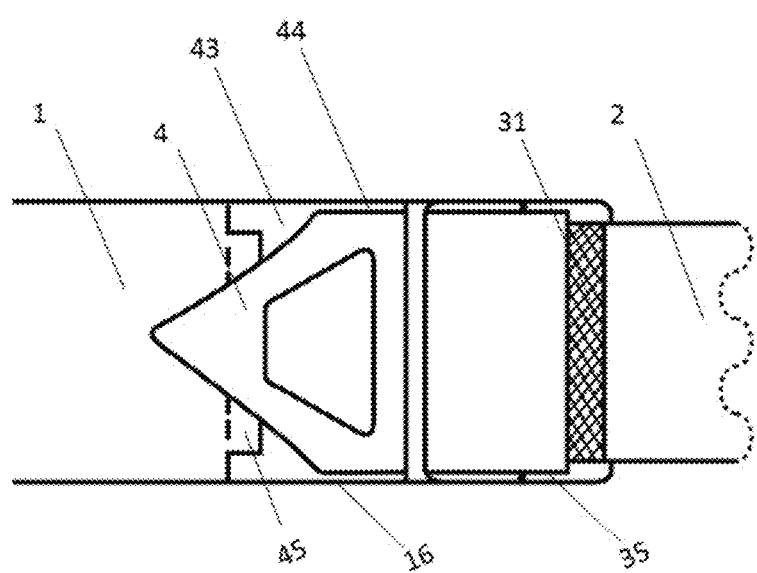
FIG. 18 is a schematic diagram of an elastic blocking structure of the present disclosure.

In the above embodiments, as shown in FIG. 18, an elastic blocking structure is provided at the opening in the middle portion of the inner sidewall of the running tube 1 and extrudes outwardly. The carrier structure 2 can pass through the elastic blocking structure along with the elastic deformation of the elastic blocking structure, such as a non-extrusion state 43, a compressed state 44 and a bottom non-extrusion state 45. This ensures that the air in the running tube 1 is not carried into the running space of the carrier structure 2.

In the above embodiments, a wheel-rail drive structure and/or a linear motor drive structure 12 is provided between the bottom of the carrier structure 2 and the running rail 7.

In the above embodiments, the magnetic device 23 is a permanent magnetic device and/or an electric magnetic device.

In the above embodiments, the gap between the upper wall of the running tube 1 and the top of the carrier structure 2 is 1-50 mm, preferably 1-30 mm.

In the above embodiments, the air-suction drive device 13 may be at least one of an electric fan, a fan engine, a ducted fan engine, a turbofan engine, a turbojet engine, a ramjet engine, pulse jet engine and a turbofan jet engine. The energy supplied to the air-suction drive device 13 may be at least one of electricity, hydrogen, oxygen and fuel, preferably at least one of electricity, hydrogen and oxygen.

In the above embodiments, a plurality of sensors are provided on the carrier structure 2, the running rail 7, the running tube 1, the air-suction drive device 13, the plurality of one-way airflow windows 3, the carrier structure 2 and the blocking-type running drive structure 4. The plurality of sensors are electrically connected to the control system.

In the above embodiments, a sliding rail is mounted on the left and right inner sidewalls of the running tube 1, respectively. A pulley is mounted on the outer side face corresponding to the carrier structure 2 and/or the blocking-type running drive structure 4 sliding along the sliding rail.

When the transporter is in operation, the drive device 11 of the blocking-type running drive structure 4 is started by the control system, so that the blocking-type running drive structure 4 runs forwardly, and the air pressure in the front of the blocking-type running drive structure 4 increases as the running speed rises. When the air pressure in the running tube 1 is larger than the air pressure outside the running tube 1, the plurality of passive opening type one-way airflow windows 9 located in the front of the carrier structure 2 are opened, so that the air flows from inside to outside of the running tube 1. When the blocking-type running drive structure 4 passes through the plurality of one-way airflow windows 3 in an opened state, the air volume in the running tube 1 is significantly reduced due to the blocking and exhausting effect of the blocking-type running drive structure 4, so that a low pressure is formed in the rear of the blocking-type running drive structure 4, and the plurality of one-way airflow windows 3 are closed to locally form a low-pressure state in the running tube 1. At the same time, the running blocking structure 26 is located in the rear of the carrier structure 2, and avoids a large amount of air in the rear of the carrier structure 2 entering into the low-pressure area of the carrier structure in a blocking manner with a baffle-like structure having the same inner peripheral shape of the running tube 1, maintaining the local low pressure of the carrier structure 2. A drive device 12 of the carrier structure 2 and the exhaust power device 8 of the running blocking structure 26 are started, the carrier structure 2 runs in the running tube 1 in the low-pressure state, and the exhaust power device 28 discharges the small amount of the air in the carrier structure 2 to the rear of the running blocking structure 26 located in the rear of the carrier structure 2 through the air outlet 30 at high-speed suction power, so that the air resistance is reduced. At the same time, the wheel-rail drive structure and/or the linear motor drive structure 12 are started to push the carrier structure 2 to run forwardly. The carrier structure 2 runs in a low-resistance state by maintaining the local low-pressure state. The gap between the outer side face of the blocking-type running drive structure 4 and the inner sidewall of the running tube 1 is significantly smaller than the gap between the outer side face of the carrier structure 2 and the inner sidewall of the running tube 1, so that the amount of air leaked in the carrier structure 2 in the running process is significantly less than the amount of air in the normal pressure state to form a negative pressure, reducing the air resistance.

The technical effects of the present disclosure will be further described below by specific embodiments.

Example 1 a Simulation Experiment of the Plurality of Passive Opening Type One-Way Airflow Windows Experimental materials: 500×375×375 mm electric remote control toy car, remote control, plexiglass plate with thickness of 3 mm, rubber washer and 400×400 mm plexiglass tube.

Preparation of experimental devices: 90×90 mm square hole was laterally opened on the sidewall of the plexiglass tube at 100 mm intervals. The plexiglass plate was cut into 100×100 mm square plate, and the rubber washer cut into 95×95 mm was adhered at one side of the square plate. The rubber washer was inwardly fixed to the outside of the square hole of the plexiglass tube in a suspension manner. The length of the plexiglass tube in the straight-line connection was 20 m. The electric remote control toy car was placed at one end of the tube.

Experimental method and result: the electric remote control toy car was remotely started to accelerate, the electric remote control toy car ran fast in the tube. The plexiglass plate in a suspension state was started before the electric remote control toy car entering into the square hole, and was closed when the electric remote control toy car passed through the square hole. The running speed of the electric remote control toy car in the tube was not slowed down significantly. The experiment was ended. It is indicated that the plurality of passive opening type one-way airflow windows of the present disclosure was opened when the airflow in the tube was pressurized, and was closed after the pressure was released.

Example 2 Experiment on Reducing Pressure in the Running Tube in a Blocking-Type Running Manner (1)

Experimental materials: stainless steel plate with thickness of 1.5 mm, 30×30 mm angle iron, steel wire rope with diameter of 3 mm, rubber washer, hinge, permanent magnetic block, 15 KW three-phase motor, vertical winch, bearing and 0-100 KPa vacuum pressure gauge.

Preparation of Experimental Devices:

1. Preparation of the running tube: The stainless steel plate with the thickness of 1.5 mm was made into 150 stainless steel pipes with a length of 1.5 m and a diameter of 600×600 mm as shown in FIGS. 2, and 9 of 100×150 mm one-way airflow windows were provided on each side of the stainless steel pipes with the stainless steel plate being used as window covers. The rubber washer was used as sealing strip and the permanent magnetic block was used as closer. The stainless steel pipes were abutted on the test site where the surface treatment was carried out in advance, and were fixedly connected by screws to prepare a test running tube with a length of 200 m.

2. Preparation of a pulling running device: The roller of the winch was installed vertically, and the 15 KW three-phase motor was vertically installed at the upper end of the roller. One end of the steel wire rope was fixedly connected to the roller.

Figure 4:
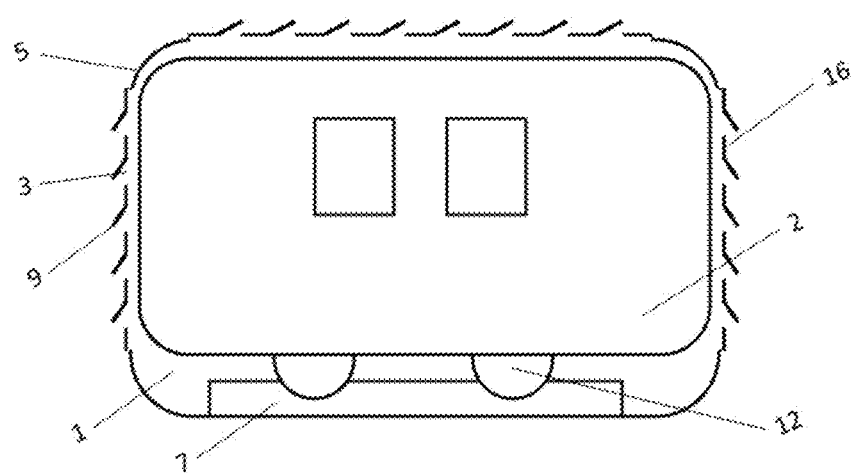
FIG. 4 is a schematic diagram of a position relation of a carrier structure and the plurality of one-way airflow windows provided on the left and right inner sidewalls and an upper sidewall of the running tube.

3. Preparation of the blocking-type running drive structure: The angle iron was made into 590×590×590 mm square bracket. The outer circumference of the square bracket was packed with the stainless steel plate with the thickness of 1.5 mm, and the upper, lower, left and right sides of the square bracket were symmetrically installed with a bearing respectively. The front portion of the blocking-type running drive structure was mounted with a pulling hook and an extension structure as shown in FIG. 4, and the rear portion thereof was a window structure that can be opened and closed.

4. Preparation of the carrier structure: The angle iron was made into 1200 (length)×580 (width)×580 mm (height) rectangular bracket. The outer circumference of the rectangular bracket was packed with the stainless steel plate with the thickness of 1.5 mm, and the upper, lower, left and right sides of the rectangular bracket were symmetrically installed with a bearing as a sliding wheel, respectively. The rear portion of the carrier structure was a window structure that can be opened and closed.

5. Preparation of the running blocking structure: The angle iron was made into 590×590×590 mm square bracket. The outer circumference of the square bracket is packed with the stainless steel plate with the thickness of 1.5 mm, and the upper, lower, left and right sides of the square bracket were symmetrically installed with a bearing, respectively.

Experimental Methods and Results:

Experiment 1: The pulling running device was fixed to the outside of the one end (outlet end) of the running tube, and was connected to the blocking-type running drive structure through the steel wire rope. The blocking-type running drive structure was pushed into the tube and then pulled to other end (inlet end) of the running tube. A load of 100 kg was loaded into the carrier structure and was pushed into the running tube through the inlet end, and then the running blocking structure was pushed into the running tube. The blocking-type running drive structure, the carrier structure and the running blocking structure which were not directly connected to each other were sequentially arranged in the running tube and were connected to the pulling running device. The pulling running device was started, the steel wire rope was pulled at a speed of 15 m/s to drive the blocking-type running drive structure to slide forwardly in the running tube. The plurality of one-way airflow windows were opened immediately before the blocking-type running drive structure pulled by the steel wire rope passed through, and were rapidly closed after the blocking-type running drive structure passed through. At the same time, the carrier structure and the running blocking structure rapidly ran forwardly in the running tube, and the plurality of one-way airflow windows were in a closing state. It is indicated that the blocking-type running drive structure discharged the air in the running tube located in the front of the blocking-type running drive structure through the plurality of one-way airflow windows, and a low pressure was formed in the rear of the blocking-type running drive structure due to the blocking function of the carrier structure and the running blocking structure, thus the carrier structure and the running blocking structure were pushed to run forwardly. The experiment was ended.

Experiment 2: Under the above conditions, a vacuum pressure gauge and a reading table camera were installed in the rear of the blocking-type running drive structure, and the inlet end of the running tube was closed. The pulling running device was started, the steel wire rope was pulled at a speed of 30 m/s to drive the blocking-type running drive structure to slide forwardly in the running tube. The plurality of one-way airflow windows were opened immediately before the blocking-type running drive structure pulled by the steel wire rope passed through, and were closed after the blocking-type running drive structure passed through. At the same time, the carrier structure and the running blocking structure rapidly ran forwardly in the running tube, and the plurality of one-way airflow windows were in a closing state. The pressure change displayed on the vacuum pressure gauge was read. As a result, the number displayed on the vacuum pressure gauge was decreased from 100 KPa to 84 KPa. The experiment was ended. It is indicated that a negative pressure was locally generated in the running tube.

Example 3 Experiment on Reducing Pressure in the Running Tube in a Blocking Running Manner (2)

Experimental materials: 8.5 KW crop protection motor, 11V 8000 mA DUPU lithium battery, rubber wheel with the diameter of 180 mm, electronic speed controller, 0-100 KPA vacuum pressure gauge, remote control, bearing and the remaining being the same as Example 2.

Preparation of Experimental Devices:

1. Preparation of the running tube: The preparation method was the same as Example 2.

2. Preparation of the blocking-type running drive structure with a drive device: The angle iron was made into 590×590×590 mm square bracket. The stainless steel plate with the thickness of 1.5 mm was mounted at the bottom of the square bracket as a base plate and on both sides as side plates. Four crop protection motors were fixedly connected to the rubber wheel and the side plates. The lithium battery and the electronic speed controller were fixedly mounted, and the remote control was fixed. The upper, lower, left and right sides of the square bracket were symmetrically installed with a bearing, respectively. The top plate and the front plate were made by the stainless steel plate with the thickness of 1.5 mm. The rear portion of the blocking-type running drive structure was not closed, and the front portion thereof was mounted with a pulling hook and an extension structure as shown in FIG. 4. The crop protection motors, the electronic speed controller, the lithium battery and the remote control were connected.

3. Preparation of the running blocking structure: The preparation method was the same as Example 2.

4. Preparation of the carrier structure: The preparation method was the same as Example 2.

Experimental Methods and Results:

Experiment 1: A load of 100 kg was loaded into the carrier structure, and the blocking-type running drive structure, the carrier structure and the running blocking structure were sequentially pushed into the running tube through the inlet end, which were not directly connected. The crop protection motor was started by the remote control to run in the running tube at a speed of 30 m/s. The plurality of one-way airflow windows were opened immediately before the blocking-type running drive structure pulled by the steel wire rope passed through, and were rapidly closed after the blocking-type running drive structure passed through. At the same time, the carrier structure and the running blocking structure rapidly ran forwardly in the running tube, and the plurality of one-way airflow windows were in a closing state. It is indicated that the blocking-type running drive structure discharged the air in the running tube located in the front of the blocking-type running drive structure through the plurality of one-way airflow windows, and a low pressure was formed in the rear of the blocking-type running drive structure due to the blocking function of the carrier structure and the running blocking structure, thus the carrier structure and the running blocking structure were pushed to run forwardly. The experiment was ended.

Experiment 2: Under the above conditions, a vacuum pressure gauge and a reading table camera were installed in the rear of the blocking-type running drive structure, and the inlet end of the running tube was closed. The blocking-type running drive structure was started by the remote control to run in the running tube at a speed of 30 m/s. The plurality of one-way airflow windows were opened immediately before the blocking-type running drive structure pulled by the steel wire rope passed through, and were rapidly closed after the blocking-type running drive structure passed through. At the same time, the carrier structure and the running blocking structure rapidly ran forwardly in the running tube, and the plurality of one-way airflow windows were in a closing state. The pressure change displayed on the vacuum pressure gauge was read. As a result, the number displayed on the vacuum pressure gauge was decreased from 100 KPa to 85 KPa. The experiment was ended. It is indicated that a negative pressure was locally generated in the running tube.

Example 4 Simulation Experiment on Controlling the Running Through Magnetic Repulsion Experimental materials: 150 mm×50 mm×10 mm NdFeB rare earth permanent magnet plate, 120 mm ducted fan engine with 12 blades, remote control and stainless steel plate.

Preparation of experimental devices: 400×400 mm stainless steel square tube was welded with a length of 6 m, extending in an arc shape. A stainless steel box with 380 mm (height)×380 mm (width)×400 mm (length) was welded. A round hole with a diameter of 155 mm was cut in the front and rear of the stainless steel box, and 120 mm ducted fan engine with 12 blades was installed into the stainless steel box with the air inlet in the front and the air outlet in the rear. The NdFeB rare earth permanent magnet plates were continuously arranged on the inner sidewall of the stainless steel square tube at a height of 250 mm to 300 mm, and the NdFeB rare earth permanent magnet plates were continuously arranged at the corresponding position (at a height of 250 mm to 300 mm) on the outer sidewall of the stainless steel square tube in a reverse magnetic pole direction. The stainless steel box installed with the 120 mm ducted fan engine with 12 blades was put into the starting end of the stainless steel square tube. The rear end of the stainless steel box was connected to a steel wire with a length of 5.5 m, and the stainless steel box was fixedly connected to the fixing bracket outside the stainless steel square tube on the ground.

Experimental method and result: The 120 mm ducted fan engine with 12 blades was started by the remote control to accelerate to the maximum. The stainless steel box in the stainless steel square tube rapidly slid forwardly in an arc shape, and was stopped by the steel wire when it was closed the exit of the running tube. The running speed was not affected by the arc running in the running process. The engine was turned off by the remote control, and the stainless steel square tube provided with the stainless steel box was turned to the left at an angle of 45 degree. The positions of the NdFeB rare earth permanent magnet plates in the stainless steel box in the stainless steel square tube were suspended. It shows that the magnetic repulsion structure can achieve the smooth running in a controlling manner. The experiment was ended.

Example 5 Effect of the Blocking-Type Running Pressure-Reducing Structure on the Maintenance of the Low Pressure in the Running Tube Experimental materials: 120 mm ducted fan engine with 12 blades, and the remaining being the same as Example 2.

Preparation of Experimental Devices:

1. Preparation of the running tube: The preparation method was the same as Example 2.

2. Preparation of the pulling running device: The preparation method was the same as Example 2.

3. Preparation of the blocking-type running drive structure: The preparation method was the same as Example 2.

4. Preparation of the carrier structure: The preparation method was the same as Example 2.

5. Preparation of the blocking-type running pressure-reducing structure: The angle iron was made into 590×590×590 mm square bracket. The outer circumference of the square bracket was packed with the stainless steel plate with the thickness of 1.5 mm, and the upper, lower, left and right sides of the square bracket were symmetrically installed with a bearing, respectively. The front and rear of the square box were opened with a hole and were mounted with a ventilation duct, respectively. The air inlet was faced to the front of the running direction and the air outlet was faced to the rear of the running direction. The 120 mm ducted fan engine with 12 blades was installed and fixed into the ventilation duct.

Experimental Method and Result:

The experiment was the same as Example 2, under the above conditions, the blocking-type running drive structure, the carrier structure and the blocking-type running pressure-reducing structure were sequentially pushed into the running tube. The rear end of the blocking-type running pressure-reducing structure was fixed to the inlet end of the running tube, so that the blocking-type running pressure-reducing structure did not run in the running tube. The vacuum pressure gauge was placed in the front of the blocking-type running pressure-reducing structure, and the camera was installed. The pulling running device was started to pull the steel wire rope at a speed of 30 m/s to drive the blocking-type running drive structure to slide forwardly in the running tube. The plurality of one-way airflow windows were opened immediately before the blocking-type running drive structure pulled by the steel wire rope passed through, and were rapidly closed after the blocking-type running drive structure passed through. At the same time, the carrier structure rapidly ran forwardly in the running tube, and the plurality of one-way airflow windows were in a closing state. When the blocking-type running drive structure was pulled to the outlet end to be fixed, the pressure change displayed on the vacuum pressure gauge was continuously observed for 5 minutes. The ducted fan engine in the experimental group was started, and the ducted fan engine in the control group kept the turning-off state. As a result, the number displayed in the vacuum pressure gauge of the control group was decreased from 100 KPa to 85 KPa, and the pressure in the running tube was recovered to 100 KPa when subsequently observing for 30 seconds. The number displayed in the vacuum pressure gauge of the experimental group was dropped from 100 KPa to 86 KPa, and the pressure in the running tube was recovered to 95 KPa when subsequently observing for 30 seconds, and was remained at 99 KPa after 5 minutes. It is indicated that the blocking-type running pressure-reducing structure assisted in maintaining the negative pressure state in the running tube. The experiment was ended.

Example 6 Experiment on Tube Pulling with a Flexible Telescopic Connecting Structure Experimental materials: sponge pad, flexible spring, and the remaining being the same as Example 2.

Preparation of Experimental Devices:

1. Preparation of the running tube: The preparation method was the same as Example 2.

2. Preparation of the pulling running device: The preparation method was the same as Example 2.

3. Preparation of the blocking-type running drive structure: The preparation method was the same as Example 2.

4. Preparation of the carrier structure: The preparation method was the same as Example 2.

5. Preparation of the running blocking structure: The preparation method was the same as Example 2.

6. Preparation of the flexible telescopic connection structure: The sponge pads were superimposed to a thickness of 50 cm, and each side was opened with a hole, and the flexible spring was introduced. The two ends of the flexible spring were fixedly connected to the blocking-type running drive structure and the carrier structure respectively.

Experimental Methods and Results:

Experiment 1: The pulling running device was fixed to the outside at one end (outlet end) of the running tube, and was connected to the blocking-type running drive structure via a steel wire rope. The running blocking structure and the carrier structure connected to the combined device were pushed into the running tube and were pulled to the other end (inlet end) of the running tube. A load of 100 kg was loaded in the carrier structure, and then the running blocking structure was pushed into the running tube from the inlet end. The blocking-type running drive structure, the carrier structure and the running blocking structure which were connected to the pulling running device were sequentially arranged in the running tube. The carrier structure was not directly connected to the running blocking structure. The pulling running device was started to pull the steel wire rope at a speed of 15 m/s to drive the blocking-type running drive structure to slide forwardly in the running tube. The plurality of one-way airflow windows were opened immediately before the blocking-type running drive structure pulled by the steel wire rope passed through, and were rapidly closed after the blocking-type running drive structure passed through. At the same time, the carrier structure and the running blocking structure rapidly ran forwardly in the running tube, and the plurality of one-way airflow windows were in a closing state. It is indicated that the blocking-type running drive structure was connected to the carrier structure through the flexible telescopic connecting structure, and discharged the air in the running tube located in the front of the blocking-type running drive structure through the plurality of one-way airflow windows, and a low pressure was formed in the rear of the blocking-type running drive structure due to the blocking function of the carrier structure and the running blocking structure, thus the carrier structure and the running blocking structure were pushed to run forwardly. The result met the expectation of the experimental design. The experiment was ended The above embodiments are only illustrative of the present disclosure, and the structures, the connecting manners and the like of the components may be modified. Any equivalent transformation and improvement based on the above technical solutions should fall in the scope of the present disclosure.

What is claimed is:

1. A high-speed transportation device with a transporter enveloped by low pressure in a running tube, comprising:
    the running tube,
    a running rail,
    a carrier structure,
    a controller,
    a brake, and
    a driving system; wherein
    the running tube is an extended tubing structure enveloped by a tubing wall; a plurality of one-way airflow windows are installed on the tubing wall; and a direction of airflow passing through the plurality of one-way airflow windows is controllable;
    the driving system comprises a front blocking structure in the running tube; the front blocking structure is provided with a drive device; the front blocking structure is provided in a front of the carrier structure and is configured to block a cross section of an inner cavity of the running tube, and is able to run back and forth by the drive device;
    the driving system comprises a rear blocking structure in the running tube; the rear blocking structure is provided in a rear of of the carrier structure and is configured to block the cross section of the inner cavity of the running tube, and is able to run back and forth;
    the front blocking structure, one or more of the carrier structure and the rear blocking structure are sequentially arranged in the running tube from front to rear along a running direction of the carrier structure;
    a connector is provided between the front blocking structure and the carrier structure to connect the front blocking structure and the carrier structure;
    each of the front blocking structure and the rear blocking structure is provided with an auxiliary blocking structure;
    a cross-sectional area of the running tube, which is blocked by the front blocking structure and the auxiliary blocking structure of the front blocking structure, is larger than or equal to a cross-sectional area of the running tube which is blocked by the carrier structure;
    a cross-sectional area of the running tube, which is blocked by the rear blocking structure and the auxiliary blocking structure of the rear blocking structure, is larger than or equal to the cross-sectional area of the running tube which is blocked by the carrier structure; and
    the driving system comprises a pressure-reducing structure; the pressure-reducing structure is an exhaust device directly or indirectly connected to the carrier structure, and is provided with an exhaust power device; an air inlet of the exhaust power device communicates with a cavity gap formed between an outer circumferential wall of the carrier structure and an inner sidewall of the running tube; and an air outlet of the exhaust power device communicates with air in the running tube located in a rear of the rear blocking structure and/or in a front of the front blocking structure.

2. The high-speed transportation device of claim 1, wherein a ratio of the cross-sectional area of the running tube, which is blocked by the front blocking structure, to the cross-sectional area of the running tube, which is blocked by the carrier structure, is 1:1-1:0.7; and a ratio of the cross-sectional area of the running tube, which is blocked by the rear blocking structure, to the cross-sectional area of the running tube, which is blocked by the carrier structure, is 1:1-1:0.7.

3. The high-speed transportation device of claim 1, wherein the plurality of one-way airflow windows comprise a plurality of first one-way airflow windows and a plurality of second one-way airflow windows; wherein
    1) the plurality of first one-way airflow windows are able to be passively opened under an air pressure difference formed inside and outside of the running tube, and are able to be opened outward when an air pressure inside the running tube is higher than an air pressure outside of the running tube; and the plurality of first one-way airflow windows are distributed at multiple parts of a wall of the running tube; and
    2) the plurality of type second one-way airflow windows are able to be actively opened, and are able to be opened outward or inward; and the plurality of second one-way airflow windows are distributed at multiple parts of the wall of the running tube.

4. The high-speed transportation device of claim 1, wherein the connector is flexible or rigid and is telescopic or non-telescopic.

5. The high-speed transportation device of claim 1, wherein an elastic blocking structure is provided at a periphery of the inner sidewall of the running tube; the elastic blocking structure is provided with an opening in a middle of the elastic blocking structure to allow the front blocking structure, the carrier structure and the rear blocking structure to pass through; the elastic blocking structure is configured to avoid air in the running tube from entering into the carrier structure through the cavity gap between the outer circumferential wall of the carrier structure and the inner sidewall of the running tube.

6. The high-speed transportation device of claim 1, wherein the rear blocking structure runs back and forth by a drive device, and the rear blocking structure is not integrated with the carrier structure or is integrated with the carrier structure.

7. The high-speed transportation device of claim 1, wherein a manner for connecting the rear blocking structure to the carrier structure is flexible or rigid and is telescopic or non-telescopic.

8. The high-speed transportation device of claim 1, wherein the front blocking structure comprises at least one of the following features:
   1) a rear portion of the front blocking structure is of a planar structure or a curved structure;
   2) a middle of a front portion of the front blocking structure is protruding;
   3) the front blocking structure is able to be opened or closed from inside to outside or from a center to a periphery;
   4) the front blocking structure is provided with a plurality of drive devices; and
   5) a collision buffer structure is provided in the rear portion of of the front blocking structure to buffer a collision with the carrier structure when the carrier structure runs forwardly.

9. The high-speed transportation device of claim 1, wherein the auxiliary blocking structure is provided outside the front blocking structure and the rear blocking structure, respectively;
   wherein the auxiliary blocking structure is rollable or slidable; and
   the auxiliary blocking structure is in contact with the running tube or is not in contact with the running tube.

10. The high-speed transportation device of claim 1, wherein the running rail comprises at least one of the following features:
   1) the running rail is provided on at least one of a lower side face, an upper side face, a left side and a right side in the running tube; and
   2) a structure provided between the running rail and the drive device comprises at least one of a wheel-rail drive structure, a linear motor drive structure, and a magnetic levitation drive structure.

11. The high-speed transportation device of claim 1, wherein the carrier structure comprises at least one structure of a compartment structure and a loaded structure; and the carrier structure comprises at least one of the following features:
   1) the carrier structure is provided with an independent drive device;
   2) the carrier structure is provided in a rear of the front blocking structure;
   3) the rear blocking structure is provided in the rear of the carrier structure;
   4) a collision buffer structure is provided in the front of the carrier structure, and is collided with the rear of the front blocking structure when the carrier structure runs forwardly;
   5) an outer shape of the carrier structure is of a tube blocking structure;
   6) the carrier structure is provided with the exhaust power device;
   7) the carrier structure is provided with a wing structure extending longitudinally;
   8) a magnetic levitation structure is provided in a lower portion of the carrier structure corresponding to a lower sidewall of the running tube;
   9) a plurality of carrier structures are connected in series to run;
   10) a cross-sectional area of the carrier structure is less than or equal to a cross-sectional area of the front blocking structure;
   11) the cross-sectional area of the carrier structure is less than or equal to a cross-sectional area of the rear blocking structure.

12. The high-speed transportation device of claim 6, wherein a manner driving the drive device comprises at least one of a wheel-rail driving manner, a linear motor driving manner, and an exhaust driving manner.

13. The high-speed transportation device of claim 1, wherein a plurality of position holding structures when running in the running tube are provided on the inner sidewall of the running tube and an outer side face corresponding to the carrier structure and/or the front blocking structure and/or the rear blocking structure; the plurality of position holding structures provided on the inner sidewall of the running tube are matched with the plurality of position holding structures provided on the outer side face corresponding to the carrier structure and/or the front blocking structure and/or the rear blocking structure, respectively.

14. The high-speed transportation device of claim 13, wherein the plurality of position holding structures comprise at least one of the following features:
   1) a plurality of magnetic repulsion structures having at least one of permanent magnetism and electromagnetism are provided on a left inner sidewall and a right inner sidewall of the running tube and the outer side face corresponding to the carrier structure and/or the front blocking structure and/or the rear blocking structure; and a width of a gap between the inner sidewall of the running tube and the outer side face corresponding to the front blocking structure and/or the rear blocking structure is 1-50 mm;
   2) a sliding rail is mounted on the left inner sidewall and the right inner sidewall of the running tube, respectively; a pulley is mounted on the outer side face corresponding to the carrier structure and/or the front blocking structure and/or the rear blocking structure; and the pulley slides along the sliding rail; and
   3) a pulley is mounted on the left inner sidewall and the right inner sidewall of the running tube, respectively; a rigid sliding rail is provided on the outer side face corresponding to the carrier structure and/or the front blocking structure and/or the rear blocking structure; and the pulley slides along the rigid sliding rail.

15. The high-speed transportation device of claim 1, wherein a width of a gap between an outer circumferential wall of the front blocking structure and/or the rear blocking structure and the inner sidewall of the running tube is 1-50 mm.

16. The high-speed transportation device of claim 1, wherein the brake comprises an active closing of a plurality of one-way airflow windows on a wall of the running tube provided in a front of a running portion of the front blocking structure.

17. The high-speed transportation device of claim 1, wherein the high-speed transportation device further comprises a plurality of sensors provided on the carrier structure, the running rail, the running tube, the brake and the driving system, wherein the plurality of sensors are electrically connected to the controller.

\* \* \* \* \*